US008219470B1

(12) United States Patent
Brown

(10) Patent No.: US 8,219,470 B1
(45) Date of Patent: Jul. 10, 2012

(54) PAYCHECK VERIFICATION SYSTEM AND METHOD

(76) Inventor: Anthony Brown, Bronx, NY (US)

(*) Notice: Subject to any disclaimer, the term of this patent is extended or adjusted under 35 U.S.C. 154(b) by 283 days.

(21) Appl. No.: 12/763,293

(22) Filed: Apr. 20, 2010

(51) Int. Cl.
*G06F 15/02* (2006.01)
*G07B 17/00* (2006.01)
*G07F 19/00* (2006.01)

(52) U.S. Cl. .......................................... 705/32; 705/30
(58) Field of Classification Search .................... 705/32, 705/30
See application file for complete search history.

(56) References Cited

U.S. PATENT DOCUMENTS

| | | | | |
|---|---|---|---|---|
| 4,506,274 | A * | 3/1985 | Coe ................................. | 346/82 |
| 5,459,657 | A * | 10/1995 | Wynn et al. ...................... | 705/32 |
| 5,600,554 | A | 2/1997 | Williams | |
| 5,717,867 | A * | 2/1998 | Wynn et al. ...................... | 705/32 |
| 6,401,079 | B1 | 6/2002 | Kahn et al. | |
| 6,411,938 | B1 | 6/2002 | Gates et al. | |
| 6,764,013 | B2 | 7/2004 | Ben-Aissa | |
| 7,089,200 | B2 * | 8/2006 | Bode ............................... | 705/32 |
| 7,233,919 | B1 | 6/2007 | Braberg et al. | |
| 7,623,985 | B2 | 11/2009 | Finch, II et al. | |
| 7,881,990 | B2 * | 2/2011 | Slattery .......................... | 705/32 |
| 7,941,351 | B1 * | 5/2011 | Rosenfeld et al. .............. | 705/30 |
| 8,036,961 | B2 * | 10/2011 | Ducolon et al. ................ | 705/32 |
| 8,121,912 | B2 * | 2/2012 | Pappas et al. ................... | 705/32 |
| 8,165,936 | B2 * | 4/2012 | Chen ............................... | 705/31 |
| 2004/0019542 | A1 * | 1/2004 | Fuchs et al. ..................... | 705/32 |
| 2004/0035922 | A1 * | 2/2004 | Cameron ........................ | 235/377 |
| 2004/0181472 | A1 * | 9/2004 | Jakubowski .................... | 705/32 |
| 2005/0177477 | A1 * | 8/2005 | Arghavanifard et al. ....... | 705/32 |
| 2009/0192926 | A1 * | 7/2009 | Tarapata ......................... | 705/32 |
| 2010/0211485 | A1 * | 8/2010 | Augustine et al. .............. | 705/32 |
| 2011/0082777 | A1 * | 4/2011 | Chess ............................. | 705/32 |
| 2011/0153477 | A1 * | 6/2011 | Niazi ............................. | 705/32 |
| 2011/0191219 | A1 * | 8/2011 | Hodgin ........................... | 705/32 |

OTHER PUBLICATIONS

Zavatsky, L.. (Mar. 2010). How to Zip Up Payroll Inefficiencies. IOMA's Payroll Manager's Report, 10(3), 1,5-7. Retrieved May 11, 2012, from Accounting & Tax Periodicals. (Document ID: 1965593401).*

* cited by examiner

*Primary Examiner* — Scott Zare
(74) *Attorney, Agent, or Firm* — Michael J. Feigin, Esq.; Feigin & Associates, LLC

(57) ABSTRACT

Embodiments described herein allow a worker to use tools similar to that of an employer or payroll provider to determine, after having been paid, if the number of hours compensated for, is correct. At a first stage, a time sheet is provided for a worker in a specific industry to input a work history for the pay period. In a second stage, data from an actual pay stub is received from the worker, including hours paid and associated codes. Codes of the work hours and/or provided on the pay stub may be reconciled or used as needed, and a comparison is made to determine if the hours of the pay stub are accurate. If not, than a tool is provided to the user to petition the employer for correction.

12 Claims, 6 Drawing Sheets

| EDIT PAGE - PI INFO INSTRUCTIONS | | | |
|---|---|---|---|
| JOB INFO | | NOTES | |
| DATE | Days Off | PE JOB | |
| Do you have PI Days Off & PI jobs for each day.... Or do you only have PI Days Off? ◉ Days Off & JOBS ○ Days Off only | | Hours | Mins |
| Sunday | YES | | |
| Monday | YES | | |
| Tuesday | No | 0 | 00 |
| Wednesday | No | 0 | 00 |
| Thursday | No | 3 | 00 |
| Friday | No | 1 | 30 |
| Saturday | No | 0 | 00 |
| Submit | | | |

Figure 6

PAYCHECK VERIFICATION SYSTEM AND METHOD

FIELD OF THE DISCLOSED TECHNOLOGY

The disclosed technology relates generally to time accounting and, more specifically, to paycheck verification.

BACKGROUND OF THE DISCLOSED TECHNOLOGY

Tools for calculating employee compensation are typically designed for the employer and under the operative control of the employer. Such tools are sophisticated and advanced, including, for example, that shown in U.S. Pat. No. 6,411,938 to Intuit where, on an employer computer, pay check information is calculated for each employee. Wages, taxes, and so forth are also calculated. In another example, in U.S. Pat. No. 7,233,919 assigned to Kronos Technology Systems Limited Partnership, employee compensation is determined.

However, such tools are designed first and foremost to meet the needs of the employer. The employee, on the other hand, is often left with pen and paper or his/her own memory to determine if the amount received is correct. If it isn't, then the employee, especially at government and government-connected institutions, is often left with draconian amounts of paperwork to meticulously fill out to try and prove a disparity. The advanced tools simply are not there for the employee who often only receives a paycheck showing a dollar amount and the number of hours worked, while the employer retains information about the project on which the employee was working at any given moment, the times in and out, and so forth.

What is needed in the art is a way to even out the score and to make sure that employees are paid what they earned, while having at their disposal tools as advanced as those of their employer.

SUMMARY OF THE DISCLOSED TECHNOLOGY

It is therefore an object of the disclosed technology to provide a method for an employee to keep track of his or her hours worked.

It is a further object of the disclosed technology to provide an employee with a method of tracking, by way of time codes, the types of project worked on and/or type of pay to which s/he is entitled.

It is a further object of the disclosed technology to facilitate verification of the accuracy of the amount of time represented on a pay check.

It is yet a further object of the disclosed technology to facilitate a process of correcting an amount paid when a pay check is incorrect.

The method of verification of a paycheck in an embodiment of the disclosed technology proceeds by providing a worker with a time sheet for a pay period with a field or fields of entry for data. The fields include those for date, time, and a code (time code) related to an industry of the worker. At least one said time code is an overtime code. Then, the time sheet is received with at least one date, time, and a code in the at least one code field. After the time sheet is received, the worker is prevented from making any changes on it. Any time corresponding to the overtime code is converted into hours, that is, the number of equivalent hours at regular pay. For example, if a worker gets paid 1.5× the regular amount for overtime, then 10 overtime hours would be converted into 15 regular hours for purposes of calculation. After that, a total time worked during the pay period based on the time sheet received from the worker is calculated. Before or after the calculation steps, the worker sends and a system of the disclosed technology receives, data from an employer issued pay stub. Such data includes hours worked during the pay period for each of the time codes used (one overall time code may be used, if desired). If there are differences between the total time worked according to the worker (by way of data inputted by the worker) and according to the time stub, at least one tool is provided to the worker to aid the worker in receiving missing pay from the employer.

The tool mentioned above may include data in a form to be submitted to the employer, based on the industry of the employer. It is usable to correct the hours paid for in the pay period. In some cases, forms of an employer are used and may even be filled out automatically' however, in other cases, such forms are proprietary or copyrighted, so the data may be in another form, to be transcribed by the employer. Thus, methods of the disclosed technology may be specific to an employer, and, in such cases, an employee representative, such as a union representative or other person acting on behalf of employees may provide templates including time codes and options for the employee to choose from. That is, the time sheets provided are modified accordingly, as are, in some cases, the time codes, for use with a specific employer. Time sheets may also be pre-populated with information about standard days off, for ease of use (fields to skip). A block of time sheets is purchasable, in embodiments of the disclosed technology, by the employee, and the step of providing a time sheet to the worker/employee will occur only if the worker has any remaining time sheets (or credits usable to redeem time sheets) which are paid for; i.e., before receiving a last time sheet of the block of time sheets from the employee and the step of preventing further editing are carried out.

BRIEF DESCRIPTION OF THE DRAWINGS

FIG. 4 shows an example of entering pay periods which may be provided by a worker or defined before generating a time sheet in an embodiment of the disclosed technology.

FIG. 5 shows an example of a time sheet provided to a worker in an embodiment of the disclosed technology.

FIG. 6 shows an example of a form for providing PI information in an embodiment of the disclosed technology.

DETAILED DESCRIPTION OF EMBODIMENTS OF THE DISCLOSED TECHNOLOGY

Described on a high level, embodiments of the disclosed technology are a method and device or system to allow a worker to use tools similar to those of an employer or payroll provider to determine, after having been paid, if the amount of hours compensated for, is correct. At a first stage, a time sheet is provided for a worker in a specific industry to input a work history for the pay period, including amounts of time and associated codes for the type of work. Any time corresponding to an overtime code is converted into the proper number of hours worked. In a second stage, data from an actual pay stub is received from the worker, including hours paid and associated codes. Codes of the worker and the pay stub may be reconciled or used as needed, and a comparison is made to determine if the hours of the pay stub are accurate. If not, then a tool is provided to the user to petition the employer for correction.

Embodiments of the disclosed technology will become clearer in view of the following description of the Figures.

Figure 1:
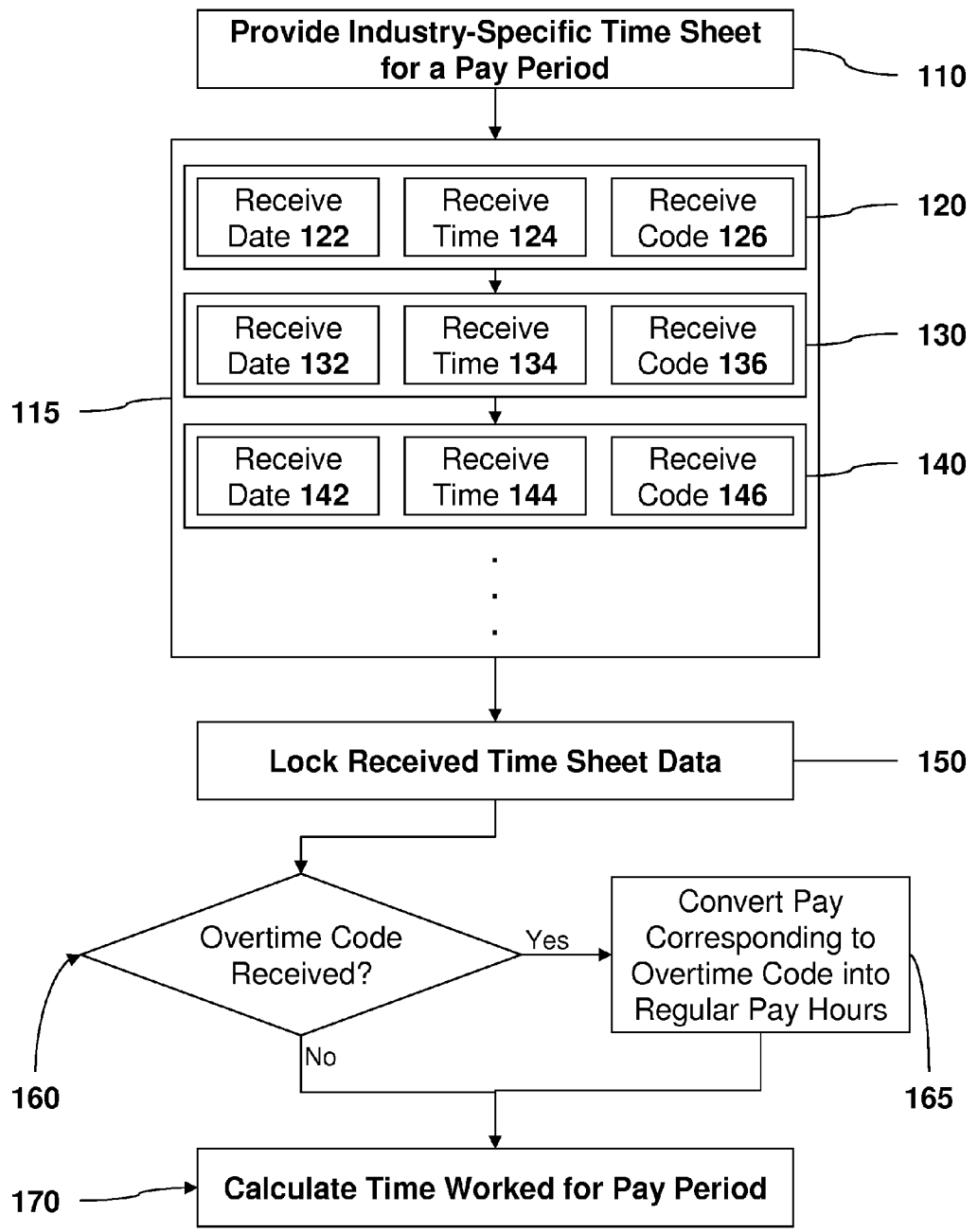
FIG. 1 is a high level block diagram of a method of receiving time data from a user.

FIG. 1 is a high level block diagram of a method of receiving time data from a user. In step 110, an industry-specific time sheet is provided for a pay period. An industry, in embodiments of the disclosed technology may be any industry known in the art relating to a specific field of jobs available at any given time, or, in embodiments of the disclosed technology is chosen from the following list or equivalent thereof: accounting-finance, advertising, agriculture, airline-aviation, architecture-building, art-photography-journalism, automotive-motor vehicles-parts, banking-financial services, biotechnology, broadcasting-radio-television, building materials, chemical, construction, computer hardware, computer software, consulting, consumer products, credit-loan-collections, defense-aerospace, education-teaching-administration, electronics, employment-recruiting-staffing, energy-utilities-gas-electric, entertainment, environmental, exercise-fitness, fashion-apparel-textile, food, funeral-cemetery, government-civil service, healthcare-health services, home-building, hospitality, hotel-resort, hvac (heating/ventilating/air conditioning), import-export, industrial, insurance, internet-ecommerce, landscaping, law enforcement, legal, library science, managed care, manufacturing, medical equipment, merchandising, military, mortgage, newspaper, not for profit-charitable, office supplies-equipment, oil refining-petroleum-drilling, other great industries, packaging, pharmaceutical, printing-publishing, public relations, real estate-property management, restaurant, retail, recreation, sales-marketing, security, securities, semiconductor, social services, telecommunications, training, transportation, travel, and wireless.

Depending on the industry, the design of the time sheet may vary. Codes for time worked may vary. A worker in some industries (e.g., transportation) may use one code for one type of work, and another, perhaps at a different pay rate, for another type of work. Some workers may receive 1.5× the number of hours pay for overtime, while the same, or another, worker, may receive 2× pay, depending on day of the week or holiday time. Thus, an industry-specific time sheet alleviates much of the manual labor of a worker in figuring out if the number of hours paid for is correct, and such calculations are pre-programmed and pre-populated into such a time sheet. A employee representative, such as a union member or a union itself, or an employee of the company (e.g., in human resources) may additionally provide such a time sheet to the user, via the disclosed technology, with data such as holiday time pre-populated in the form or pre-calculated, days off for a specific employee, and so forth, such that an advocate for the worker or the worker him- or herself may ensure that the pay is appropriate. Pre-populated is defined as automatically filled in based on data previously provided before the step which is being carried out, or filled in before providing the time sheet to the employee.

After an industry-specific time sheet is provided, in step 115, data which populates (data to fill in) the time sheet is provided. Specifically, a first set of data 120 comprising or consisting of one or all of a date 122, time 124 (number of hours or start time), and a code 126 is received. Likewise, for a second set of data 130, any one of, or multiple of, a date 132, time 134, and code 136 may be received, and so on, for more dates and times. Thus, each hour worked, or each item to be paid for, in embodiments of the disclosed technology, is associated with a code indicating its time, and the hours may be acted upon or re-calculated based on the code. For example, one code may have a maximum number of hours per day, per week, or per pay period. Another code may, as indicated above, be an overtime code and be paid as if a greater number of hours were worked, and a third code may have another different count per hours. By using this system, a worker never has to actually provide an hourly rate or amount paid, and such data remains confidential. Instead, all data is converted into units of hours, and it is the hours paid which are compared.

After receiving all the data for a pay period from a worker in step 115, the time sheet data is optionally locked in step 150. That is, the worker is prevented from changing time data after it has been submitted. The reason for this is that the worker, in embodiments of the disclosed technology, pays for each time sheet or for a block of time sheets, such as for 10 or 15 timesheets. This prevents the user from changing data on the same timesheet and recalculating. Rather, in such embodiments, the calculations, determinations of errors in pay, and so forth, are provided to the user only after the data is received or locked in, so the worker can make no further changes to the number of hours actually worked. If the worker does desire to make such a change, the worker is provided the option of purchasing or using one of their credits to regain the editing capabilities of a locked time sheet, or an override may be requested and received from an administrator of such a system.

In step 160, it is determined if an overtime code was used in any one of steps 126, 136, 146, etc. If so, then in step 165, hours entered in steps 124, 134, 144, etc. are converted into regular pay hours. That is, for example, if the time in step 124 was 4 hours and the code 126 was an overtime code, then the number of hours is multiplied by the overtime rate, which may, for example, be 1.5×. Thus, 4 hours becomes 6 hours. Similarly, steps 160 and 165 may be carried out for other codes where the pay rate is different from the base pay rate, and, in this manner, all time worked is converted into a standard number of hypothetical hours worked at the base pay rate. Such a method also works for project-based conversions where a worker is paid per project, e.g., a worker receiving $100/hr, but gets paid $3,000 to draft a patent application, might enter "1" for a quantity of time and use code "PD" for "patent drafting" and this is converted into 30 hours or multiplied by 30, without the worker ever revealing the actual pay rate.

Then, in step 170, based on all of the above, the time worked per pay period is calculated. This is the time, as entered by the worker (or his/her agent), and is in the form of hours, irrespective of pay rate, though it may be stored additionally by code or simply as the total number of hours, depending on the embodiment.

Figure 2:
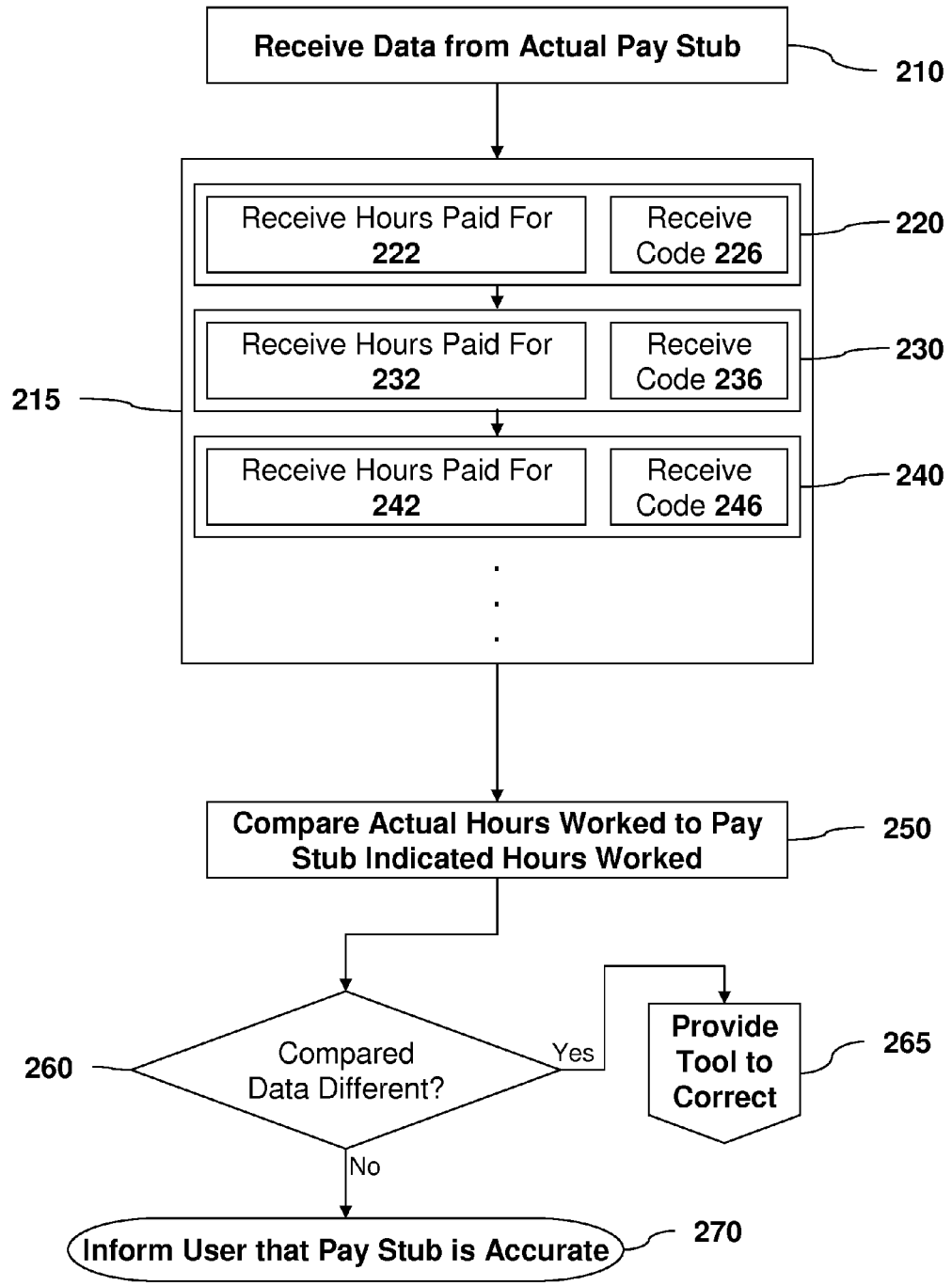
FIG. 2 shows a high level block diagram of steps taken after receiving pay stub data in embodiments of the disclosed technology.

FIG. 2 shows a high level block diagram of steps taken after receiving pay stub data in embodiments of the disclosed technology. In step 210, data from an actual pay stub is received from a worker (or his or her agent). Such data is shown in 215 and comprises any number of different hours, by code. These include receiving hours paid 222 corresponding to a code 226, hours 232 corresponding to a received code 236, and so forth. On some paychecks, a total number of hours may be shown and only a signal code will be received, such as indicating that it is regular pay or an amount corresponding to a certain number hours, as calculated at a base rate. On other paychecks, pay is divided by type, e.g., overtime, regular, holiday, office work, field work, a first task or project, a second task or project, etc. Each of these tasks/types may have a different pay rate or already be converted into a number of hours corresponding to a base rate. If the latter, then the worker need only copy the data. If the former, then a calculation may be necessary by the worker to enter the data based on a base rate or, alternatively, the received code 226, 236, or 246 may correspond to a code 126, 136, or 146, and the calculation may be made based on pre-defined data, as is specific to the industry, an employer, or pre-defined by the worker, his agent, or the like. Thus, the worker may simply enter a number of hours for each code, and based on the above, a system of the disclosed technology calculates or converts into a standard number of hours at the base rate, or the like.

After step 215 with all its details is complete (or during), step 250 is carried out, whereby actual hours worked, as entered by the user in step 115, are compared to the hours indicated on the pay stub. This information may be provided to the worker, or only problematic/conflicting data may be provided. In step 260, it is determined whether the data, as entered by the worker based on actual time worked, and data from the pay stub, are different. If all of the data match up and the worker has been paid the correct amount, the worker is informed of this, and no further action need be taken. However, where the data do not match up properly (e.g., the worker has been underpaid), a tool is provided to the user to correct the underpayment. Thus, the worker is placed on a more even playing field with the employer, as the pay stub is interpreted and compared to the worker's hours and, instead of the worker, usually by hand, having to figure out where the discrepancy lies, this may be pinpointed sufficiently, so that the worker is provided with data used to present to an employer to show where the mistake was made. In this manner, the worker is ensured of being paid (or at least bringing a valid claim for) the proper amount. Details of doing so are described in greater detail with reference to FIG. 3.

Figure 3:
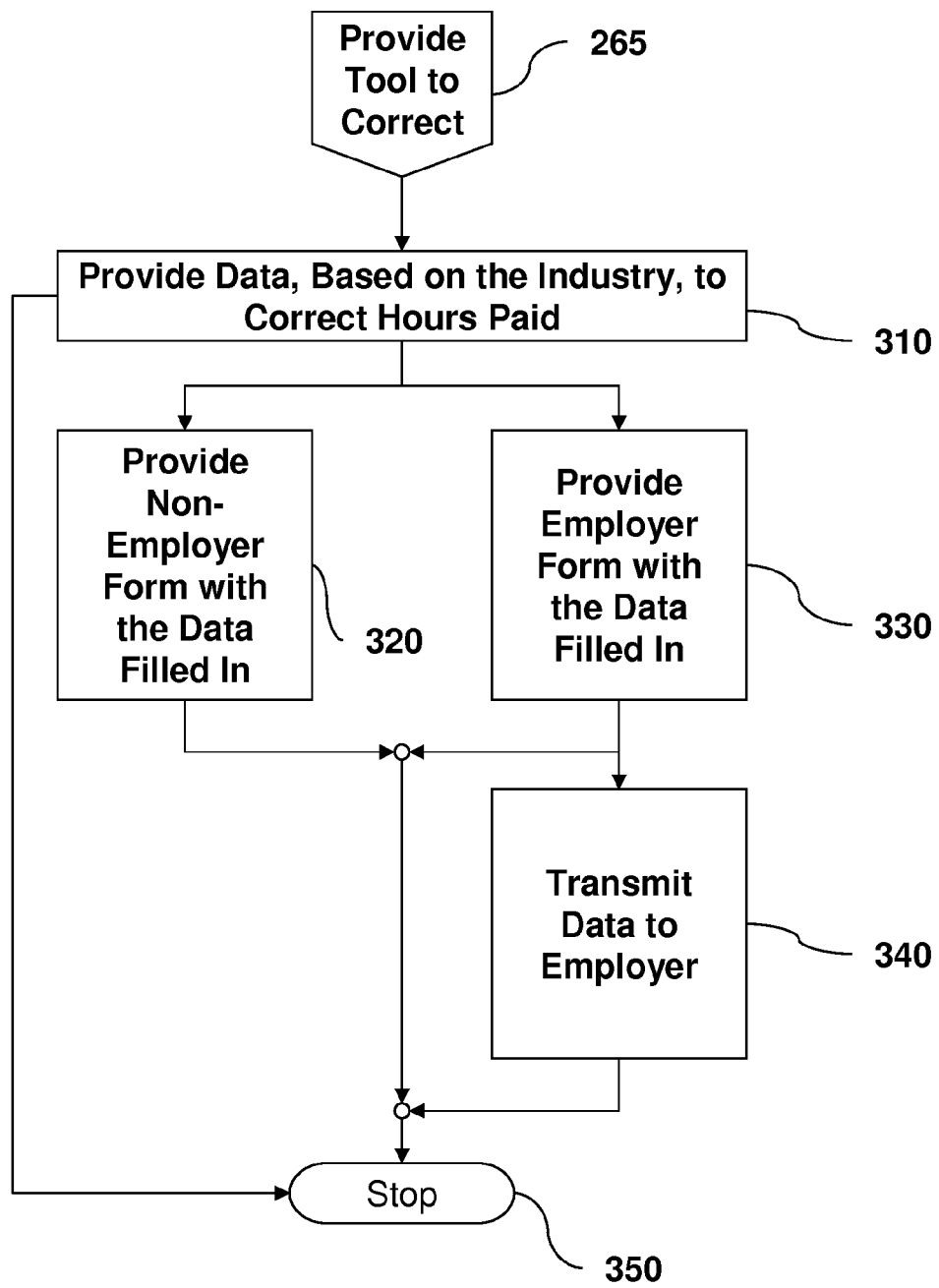
FIG. 3 shows a high level block diagram of a relationship between tools used to correct a paycheck in embodiments of the disclosed technology.

FIG. 3 shows a high level block diagram of a relationship between tools used to correct a paycheck in embodiments of the disclosed technology. When a tool is provided in step 265 (of FIG. 2, continued here, on FIG. 3), in step 310, data is provided, based on the industry of the employee or employer, to correct the number of hours paid. Then, depending on the employer, a form may be available for submission to the employer in order to claim owed pay. Such a form may be provided, already filled out based on the discrepancies found and exact dates and times the worker worked, in step 330. In some cases, the data may then be automatically transmitted (e.g., via e-mail or secure server on the employer with which a device of the disclosed technology interacts) to the employer, in step 340. In other cases, no such form is available, or the form is copyrighted or otherwise prevented from being used outside the employer's office or control. In such cases, step 320 may be carried out, whereby a non-employer form with the data filled in is provided to the worker. It is then up to the worker to submit transfer of the data to an employer form, in accordance with employer policies, or bring the data to the employer for correction of a paycheck.

Figure 4:
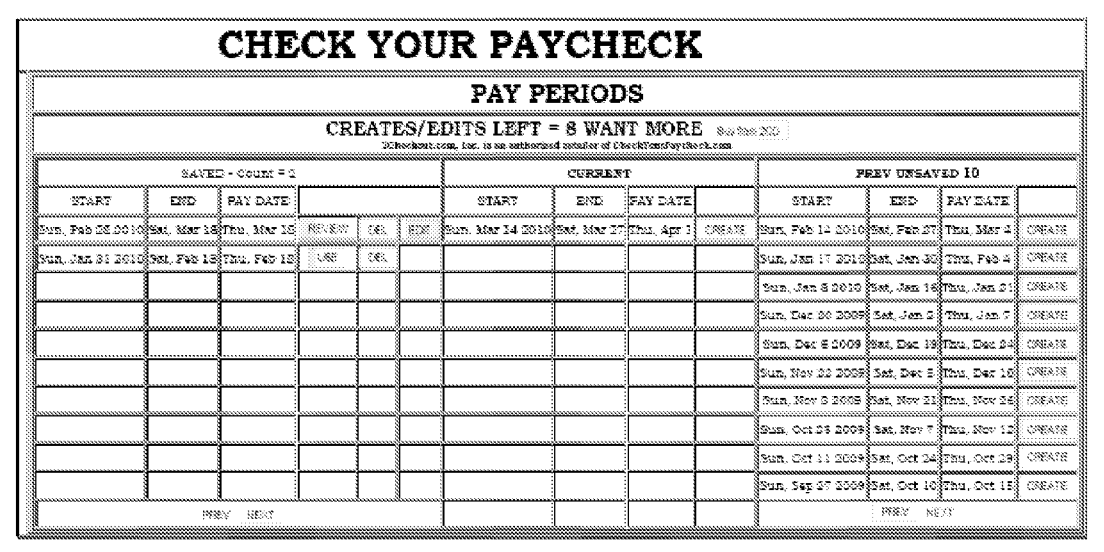

FIG. 4 shows an example of entering pay periods which may be provided by a worker or defined before generating a time sheet in an embodiment of the disclosed technology. Here, the worker, a representative or agent of the worker (such as a union member or other employee), a seller of the system or device enabling the user to carry out embodiments of the disclosed technology, or the like, defines pay periods. A time sheet is ultimately generated based on the pay period and may be auto-generated based on one, two, or four week pay periods, etc. The pay period may vary according to the industry and pre-defined accordingly.

Figure 5:
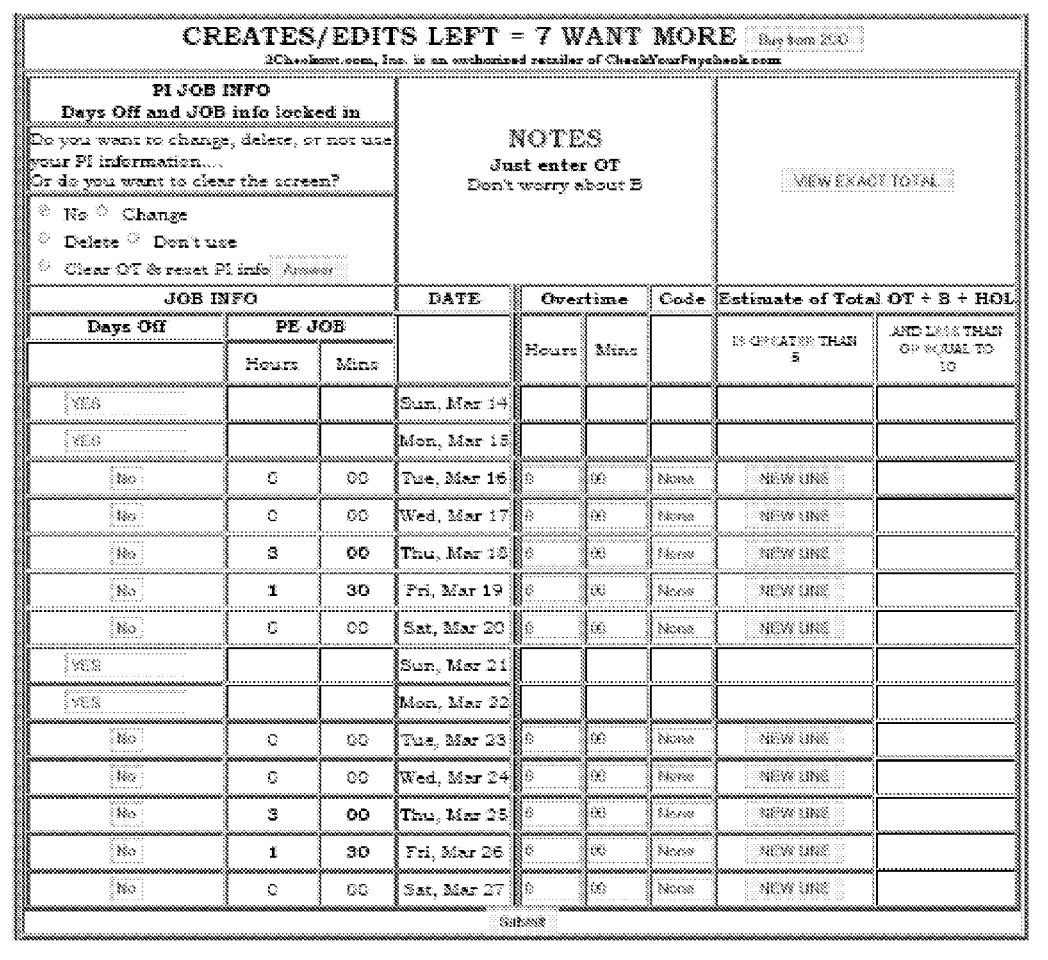

FIG. 5 shows an example of a time sheet provided to a worker in an embodiment of the disclosed technology. Note that some fields may be pre-populated before being printed out or used on a screen in a computer-implemented method. For example, dates within the time period may be pre-populated and vacation or known days off (e.g., every Monday or an entire week) may be grayed out. Note that in an embodiment of the disclosed technology, a worker must pay for each time sheet used to carry out embodiments of the disclosed technology, or pays in blocks, that is, pays for a plurality of uses of time sheets each time a payment is made. Hence, this example time sheet shows, "CREATES/EDITS LEFT=7" with an option to buy more. Note that the worker may write in or type (depending on embodiment) days off vs. days worked, hours, minutes, overtime, a code and so forth. As described above, the code may be used for calculations after receiving the time sheet, so as to ensure the received time sheet data is in the same format as the paycheck data. "PI JOB INFO" may also be selected, and/or another form may be filled out in conjunction with the selection which, as known in the art, indicates a regular schedule of days off vs. working days, so as to populate the form with correct days off data, saving the worker time. Upon receiving worker information regarding days off and scheduled work hours, the provided time sheet is pre-populated, in embodiments of the disclosed technology, with said days off and scheduled work hours information FIG. 6 shows an example of a form for providing PI information in an embodiment of the disclosed technology. PI days are defined above in the preceding paragraph as a regular schedule of days which are always on or always off (worked or not worked). Here, for example, the worker has selected that they are always off on Sunday and Monday (note the "YES" entry in the "Days Off" field) and always work 3 hours on Thursday and 1 hour 30 minutes on Friday. Such data is then pre-populated into a time sheet provided for the user to work with, either on paper or on a screen of a computer.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

I claim:

1. A paycheck verification method comprising the steps of:
   providing on a display device a time sheet for a pay period to a worker with fields of entry for data, said fields comprising a date field, a time field, and at least one time code field with selectable time codes,
   wherein said selectable time codes comprise:
   a time code related to an industry of said worker; and
   an overtime code;
   receiving on a network node data corresponding to completed fields of entry on said time sheet with at least one date in said date field, at least one time in said time field, and at least one selectable time code in said at least one time code field;
   configuring a processor to prevent said worker from changing said time sheet after said step of receiving;

via a processor, converting time corresponding to said overtime code into hours;

via a processor, calculating a total time worked for said pay period based on said time sheet received from said worker;

receiving from said worker, data from an employer-issued pay stub comprising of hours worked during said pay period for each of a plurality of time codes;

determining, via a processor, differences between total time worked according to said worker and according to said pay stub; and providing at least one tool to said worker to receive missing pay from said employer for the determined differences between total pay owed according to said worker and according to said employer.

2. The method of claim 1, wherein said at least one tool comprises data to be submitted to said employer, based on said industry, usable to correct said hours paid in said pay period.

3. The method of claim 2, wherein said data to be submitted to said employer is presented in a format different from said format required by said employer.

4. The method of claim 2, wherein said at least one tool comprises a form of said employer.

5. The method of claim 4, wherein said data to be submitted to said employer is provided in appropriate fields on said form of said employer.

6. The method of claim 1, wherein said method is specific to an employer.

7. The method of claim 6, wherein time codes and options provided to said worker in said time sheet are pre-selected by a worker representative.

8. The method of claim 7, wherein said worker representative is part of a union representing said worker.

9. The method of claim 1, wherein, upon receiving worker information regarding days off and scheduled work hours, said provided time sheet is pre-populated with said days off and scheduled work hours information.

10. The method of claim 9, wherein a block of said time sheets is purchasable by said worker, and said step of providing a said time sheet is provided to said worker only before receiving a last time sheet of said block of time sheets from said worker, and said step of preventing is carried out.

11. The method of claim 10, wherein said method is computer-implemented.

12. The method in claim 10, wherein after said step of preventing, said worker is provided with an option of purchasing or using a credit to change said time sheet data.

* * * * *